United States Patent [19]

Winnie

[11] Patent Number: 5,004,361

[45] Date of Patent: Apr. 2, 1991

[54] FASTENER FOR USE AT CRYOGENIC TEMPERATURES, AND TOOL THEREFOR

[75] Inventor: Philip D. Winnie, N. Huntingdon, Pa.

[73] Assignee: Westinghouse Electric Corp., Pittsburgh, Pa.

[21] Appl. No.: 404,137

[22] Filed: Sep. 7, 1989

[51] Int. Cl.$^5$ .................... F16B 35/00; F16B 23/00
[52] U.S. Cl. .................... 411/366; 411/339; 411/405
[58] Field of Search .............. 411/117, 338, 339, 366, 411/367, 388, 389, 405, 427

[56] References Cited

U.S. PATENT DOCUMENTS

| 173,356 | 2/1876 | Sloan | 411/405 |
| 858,394 | 7/1907 | Hutton | 411/429 |

FOREIGN PATENT DOCUMENTS

| 804871 | 5/1951 | Fed. Rep. of Germany | 411/339 |
| 551418 | 1/1923 | France | 411/339 |
| 254386 | 7/1927 | Italy | 411/339 |
| 838154 | 6/1960 | United Kingdom | 411/339 |

Primary Examiner—Neill R. Wilson
Attorney, Agent, or Firm—Michael G. Panian

[57] ABSTRACT

Fastener comprises a flat head nut having a specially designed shape and includes a complimentary bolt, for use in a cryogenic environment. Opposed heads of the nut and bolt each have an underside connecting the heads to neck and body portions, respectively, which are of a conical shape and which fit into correspondingly tapered openings of two support members of a superconducting magnetic storage device. The shape of the fastener permits a predetermined contact pressure to be maintained for the support structure as the superconducting magnet is cooled to cryogenic temperatures. The fastener produces a rigid structure to eliminate frictional heating of the magnet. A specially designed tool is provided for torquing the nut and/or the bolt. At least the nut includes three tapered slots in its head portion, and tool having three correspondingly tapered fingers. In this manner, the nut can be sufficiently held, and yet the head of the nut remains flush with the surface of the support member.

16 Claims, 2 Drawing Sheets

FASTENER FOR USE AT CRYOGENIC TEMPERATURES, AND TOOL THEREFOR

The invention relates to superconducting solenoid coils which are immersed in a cryogenic bath, and more particularly to a fastener for securing members of the superconducting magnet structure together so as to prevent frictional heating thereof.

BACKGROUND OF THE INVENTION

The electrical properties of superconducting materials, or superconductors, have led to the development of superconducting coils for storing large quantities of electrical energy in superconducting magnets. Typically, these are in the form of an annular solenoid installed such that it has a vertical axis. These solenoids are designed to have a substantial axial height and diameter, the diameter being on the order of about 500 to 1000 meters or more. Superconductive materials which are used in these devices, such as NbTi, are maintained at a temperature of approximately 1-4 degrees K (Kelvin) in order to exhibit superconducting properties. These temperatures can be maintained by surrounding the superconducting material within successive envelopes of cryogens having progressively higher boiling points.

Generally, the very low temperatures can be maintained by immersing the superconducting magnet in helium which can be made to have a boiling point lower than 4 K surrounded by, for example, another envelope of nitrogen which has a boiling point of about 77 K. Each of these cryogens can be maintained in the liquid state with a suitable refrigeration system.

During operation of such a superconducting magnet, the varying magnetic fields generated during operation can cause adjacent layers of the magnet structure, and particularly the layers of insulating material, to slide relative to one another thereby producing heat due to friction. This build up of heat must be prevented since sufficient heat generation can produce local hot spots within the magnet structure which can bring the conductor above its superconducting temperature. This can result in further heat generation which can cause the entire superconducting magnet coil to lose its superconducting properties and become normal. Such a sequence of events can cause catastrophic failure to the superconducting magnet due to heat build up from the extremely large electrical charge carried by the coil—on the order of about 50,000 Amps in the superconducting state, when the coil, in the normal state is capable of carrying only about 50-500 Amps.

A typical configuration for the superconducting magnet energy storage device includes several superconducting coils within a support structure, the support structures being secured together. The superconducting structures are joined at a lap joint, several structures joined to form the overall superconducting magnet. See FIG. 1. It is important to maintain a high contact pressure at these lap joints to prevent relative motion of one member with respect to another. Also, at certain times in the operation of the device, the joint is designed to conduct electricity from one member to the next; the amount of current that the joint can transmit is dependent upon the contact pressure. It is important that foreign materials be prevented from entering the superconducting magnet structure which could also cause loss of the superconducting properties. Thus, welding, brazing, and soldering of the lap joint are unacceptable due to the attendant problems of dirt and handling after the connection of the lap joint. Moreover, the joint must be able to withstand shear loads so that the joint itself is not damaged.

The superconducting magnet support structure is typically made of aluminum, and any fastener used must not damage this structure. Since this special care must be taken in the construction of the superconducting magnet, conventional hardware is not suitable for this purpose.

DISCLOSURE OF THE INVENTION

It is an object of the present invention to provide a fastener for joining members of a superconducting magnet coil so as to prevent the relative motion of one structure with respect to the other to preclude the possibility of frictional heating.

It is another object of the present invention to provide a fastening means which is operable at the cryogenic temperatures necessary to maintain the magnet in a superconducting state.

It is a further object of the present invention to provide a fastener which will remain flush with the surfaces of the magnet structure.

It is a still further object of the present invention to provide a fastener for use at cryogenic temperatures in a superconducting magnet support structure which will prevent damage to the structure.

The above objects are attained by the present invention, according to which, briefly stated a fastener for securing two members of a superconducting magnet and operable cryogenic temperatures is provided. The two members have axial aligned holes therethrough for receiving a fastener which comprises a generally cylindrical nut having a neck portion with an internally threaded bore therethrough and a first substantially flat head portion axially adjacent one end of the neck portion. A generally cylindrical bolt has an externally threaded body portion adapted to engage the internally threaded bore of the nut, and a second substantially flat head portion axially adjacent one end of the body portion, the nut and the bolt cooperating in such a manner that the respective head portions are disposed at opposite ends of an assembled fastener. Each of the head portions of the nut and bolt have outer circumferential surfaces which are inwardly tapered toward the neck and body portions, respectively, and the holes of the two members each have a corresponding and oppositely tapered portion adjacent one surface for respectively receiving the tapered head portions of the nut and bolt. The assembled fastener maintains a predetermined contact pressure between the two members and the flat head portions of the nut and bolt remain flush with the respective surfaces of each of the members as the two members are cooled to cryogenic temperatures, whereby frictional heating of the two members is prevented.

BRIEF DESCRIPTION OF THE DRAWINGS

Various other objects, features, and advantages of the invention will become more apparent by reading the following detailed description in conjunction with the drawings, which are shown by way of example only, wherein.

DESCRIPTION OF THE PREFERRED EMBODIMENT

Figure 1:
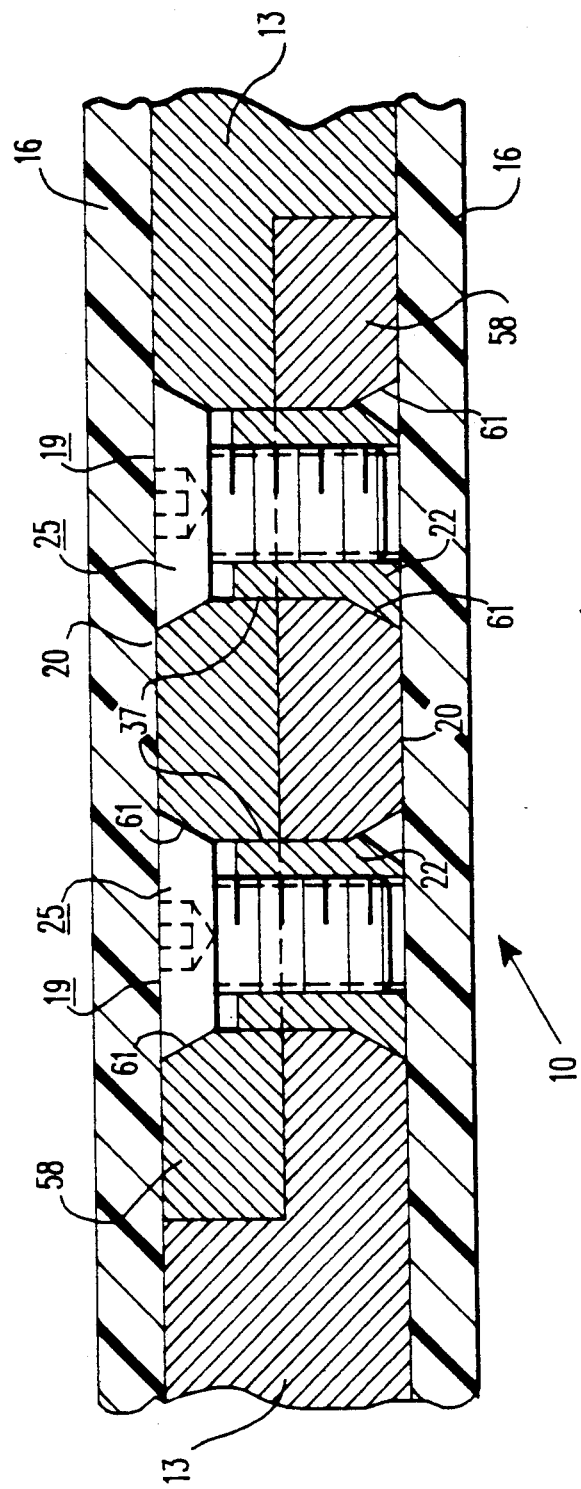
FIG. 1 is a cross-sectional view of an exemplary lap joint of a support structure having a fastener of the present therein.

Referring now to the drawings in detail, FIG. 1 shows a typical lap joint, generally designated at 10, of a supporting structure (not shown) for a superconducting magnetic energy storage device. Each layer of support members 13 have coils (not shown) secured thereto and insulation 16 is provided between the members 13. Due to the large circumferential length of the device, the support members 13, typically made of aluminum, are arranged in sections. These sections of the support structure members 13 are held rigid in an end-to-end manner by fastening means 19 located at the lap joint 10. The fastener 19 keeps the support structure rigid to prevent relative motion of one member 13 with respect to another to preclude frictional heating of the superconducting magnetic energy storage device.

FIGS. 2-5 show an exemplary fastening means 19 for use at cryogenic temperatures. A specially designed conical head portion is used to provide the large clamping force required to rigidly secure the two support members 13 together, and to ensure that the components of the fastener 19 remain flush with the lap joint surfaces 20. As shown in the figures the fastener 19 comprises a nut 22 and a bolt 25, both of which have correspondingly tapered heads 28 and 31, respectively. The nut 22 (FIG. 2) comprises a neck portion 34 having an outer diameter which is essentially equal to the diameter of axially aligned holes 37 in the support structure lap joint 10. The head 28 of the nut 22 has an outer circumferential cap portion 40 which is larger in diameter than the neck 34. Thus, the head 28 tapers radially inward from the second larger diameter of the cap portion 40 to the smaller first outer diameter of the neck 34. The nut 22 has a threaded internal bore 43 within the neck 34, the bore 43 being of a third diameter. The length of the neck 34 of nut 22 is sized so as to be greater than the thickness of members 13 at the lap joint 10 to provide a shear sleeve, as is more fully described hereinafter.

The bolt 25 (FIG. 3) has a second head 31 comprised of a second cap portion 46 which has a diameter equal to the diameter of the cap portion 40 of the nut 22. The head 31 of the bolt 25 also tapers radially inward towards a body portion 49 of the bolt 25, the head 31 thus terminating in a shoulder portion 52. The body 49 is externally threaded 55 so as to threadingly engage the internally threaded bore 43 of the nut 22. The length of the nut 22 is essentially equal to that of the body 49 of the bolt 25. In this manner, the length of the nut 22 spans the thickness of one of the members 13 at the lap joint 10 (see FIG. 5) so as to take any shear loads which may be present within the support structure, while the strength of the bolt 25 exerts a strong clamping force to substantially prevent movement therebetween which might otherwise cause frictional heating.

The frustoconical shape of the head portions 28, 31 provide several advantages. First, a large bearing area between the heads 28,31 and their respective support members 13 is provided. Thus a relatively large clamping force is available in a relatively small diameter for a joint 10 having a thin web. Second, a tapered interface between the fastener 19 and the support structure prevents the stress risers that are formed in the corners of a conventional square-shaped interface. Finally, less base material needs to be machined from the support members 13 for a conical interface than for a square-shaped one needed to provide the same clamping force, thus more material is available in the lap joint 10 to prevent over-stressing thereof. Preferably, the head portions 28, 31 are tapered at an angle of about 31°. This style nut 22 and bolt 25 obviate the need for drilling and tapping threads into the soft aluminum base metal of the support structure, where damaged threads would necessitate the disposal of the support structure. Moreover, the fastener 19 eliminates any damage which would result from shear stresses being applied to the threaded portion of a bolt 25. Additionally, the fastener 19 avoids the weakening effect of stress risers usually caused by the typical counter-boring required of normal threaded inserts. The nut 22 and bolt 25 are preferably made of the same material and used as a set. However, fastener sets can be made available from different materials to allow a proper match of thermal expansion coefficients and strengths with respect to the base metal. By way of example, the fastener may be made of aluminum to coincide with that of the base material for the support structure, or of stainless steel to provide a stronger fastener.

The dimensions of the bolt 25 are such as to withstand any tensile loading to ensure a tight joint 10 between the two support members 13. The dimensions of the head portions 28, 31 of both the nut 22 and the bolt 25, respectively, are equal so as to allow for uniform countersinking within the lap joint 10. This gives rise to ease of installation in that the nut 22 and bolt 25 can be inserted from either end. The outer diameter of the neck 34 is substantially equal to the smaller diameter of the bolt head 31 such that the bottom of the nut 22 is closely adjacent the shoulder 52 of the bolt 25 when fully threaded thereon.

FIG. 1 shows the cryogenic fastener 19 in place in a typical lap joint 10. As can be seen, the length of the nut 22 is greater than the thickness of one section 58 of the lap joint 10, or one-half the thickness of an exemplary support member 13 at this area, so as to take any shear loads between the members 13. Preferably, the overall length of an assembled fastener 19 is slightly less than the thickness of the lap joint 10, so as to provide for some clearance between the dimensions of the fastener 19 and the support members 13 to prevent the fastener 19 from projecting from the surface 20 thereof. Thus, the nut 22 and bolt 25 when assembled in the support structure do not quite abut one another or bottom-out. By not "bottoming-out", it is assured that the maximum clamping force of the fastener 19 is transmitted to the members 13 at the lap joint 10, thereby preventing a loose connection. This gap facilitates the application of the clamping force of the fastener 19, and also allows for minor machining imperfections which might otherwise cause the fastener 19 to project above (or below) the surface 20 of the support member 13, which is to be avoided. If this were to occur, the insulation 16 placed between layers of the support structure for the magnet would be crushed or pinched by the support members 13, and be less than ideally effective for the superconducting magnet energy storage device.

The length of the lap joint area 10 is typically on the order of about 5.75 to 6.0 inches; whereas its thickness is about 1.4 inches (i.e., each section 58 at the lap joint 10 is 0.7 in. thick, or one-half the thickness of the support member 13). The number of fasteners 19 used is generally dependent on this length. Preferably, the smaller dimension is used along with four (4) of the fasteners 19. This is sufficient to provide the required clamping force with the minimum number of fasteners 19 for ease of installation. If desired, the longer lap joint 10 can be utilized, with six (6) fasteners 19 therein. The two sections 58 which make up the lap joint 10 have correspondingly countersunk tapered openings 61 to receive the conical cap portions 40, 46 of the nut 22 and the bolt 25, respectively. The depth of the countersunk openings 61 is at least as great as, and preferably slightly larger than, the height of the heads 28, 31 to facilitate the flush mounting. With this fastener 19, a high contact pressure of about sixty to seventy thousand pounds (60–70,000 lbs.) can be maintained during all operating conditions, including operation at a liquid helium temperature of about 1.8 K. Preferably, the overall length of the assembled fastener 19 is about 1.3 in., or slightly less than the thickness of the lap joint 10. This both allows for machining imperfection, as well as prevents bottoming-out of the nut 22 on the shoulder 52 of the bolt 25 to ensure the desired contact pressure.

Figure 3:
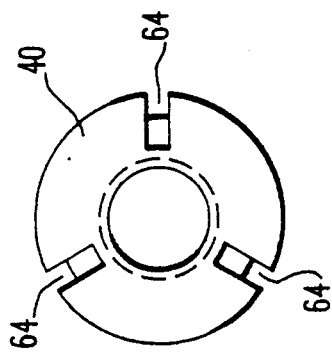
FIG. 3 is a view along the lines III—III of FIG. showing the head of the nut of FIG. 2.
Figure 2:
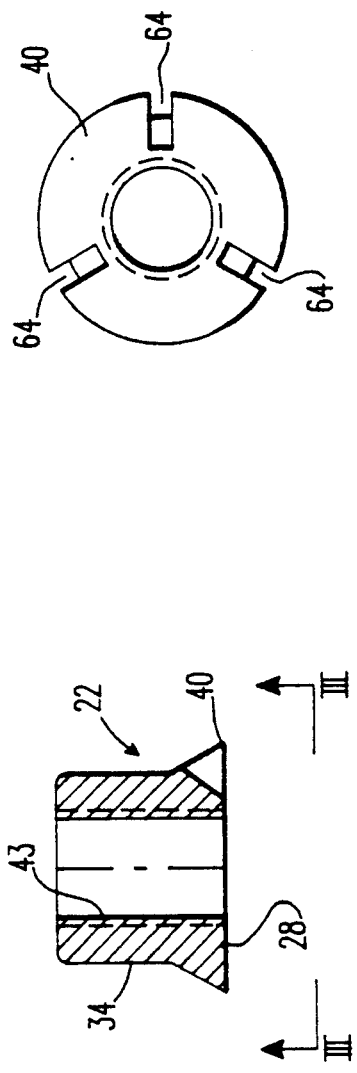
FIG. 2 is a cross-sectional view of a nut used in a fastener for the superconducting magnet support structure.
Figure 4:
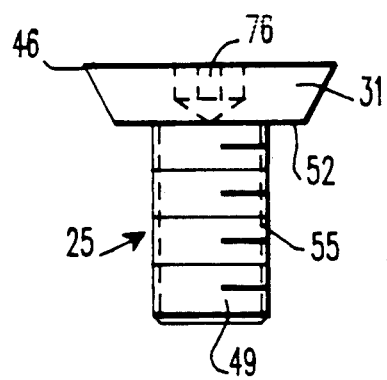
FIG. 4 is a cross-sectional view of a complimentary bolt used in the fastener.
Figure 5:
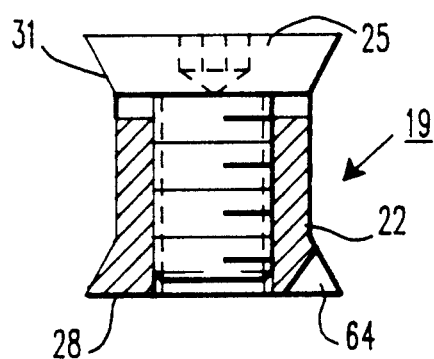
FIG. 5 is a cross-sectional view of an assembled fastener.
Figure 6:
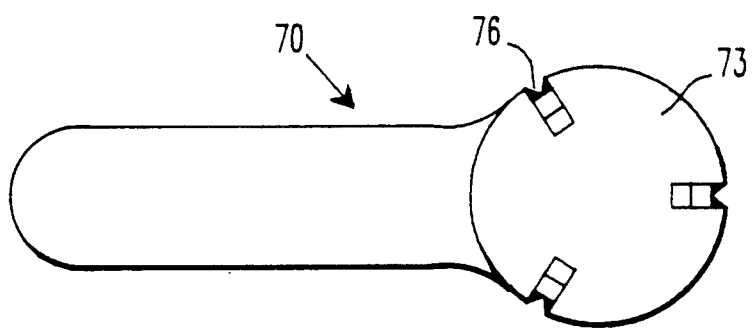
FIG. 6 is a top view of a wrench used to assemble the fastener.
Figure 7:
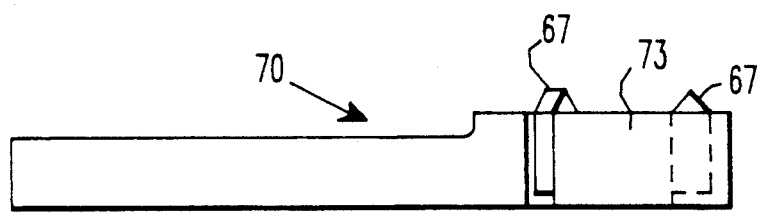
FIG. 7 is a side view of the wrench shown in FIG. 6.

The top of the nut 22, as shown in FIG. 3, includes a plurality of tapered slots 64, preferably three. These slots 64 are adapted to engage corresponding tapered fingers 67 in a wrench 70, or other torquing means, such that the head 28 of the nut 22 can remain flush with the surface 20 of the lap joint 10. FIGS. 6 and 7 show a preferred embodiment of the wrench 70 having the tapered fingers 67 in its head part 73 for engaging the slots 64 of the nut 22. Thus, no projections are necessary on the nut 22 or the bolt 25 (which is shown with a conventional hexagonal opening 76) which must be engaged by a tool, which projections might ordinarily be disposed above the surface 20 of the lap joint 10. Additionally, the head 31 of the bolt 25 may also include tapered slots, as in the nut 22, to be engaged by the specially designed wrench 70. An important advantage of the use of this torquing means is that operates to increase the amount of material in the heads 28, 31 to prevent failure of the fastener 19 at the corners of the hexagonal opening 76. Moreover, use of a single type of torquing means will add uniformity which can aid in decreasing installation time.

Thus, the flat head nut 22 offers a joint fastener operable at cryogenic temperatures which is capable of producing high tensile loads for good contact pressure and will offer sufficient protection against motion caused by shear stresses, and yet remain flush with the surface of a joint. The uniform drilling and counter-sinking which is provided by use of this device gives rise to ease of installation. This is an important advantage in that a very large number (on the order of about 136,000) of fasteners 19 are to be used for the large solenoid structure of the superconducting magnetic energy storage device.

While specific embodiments of the invention have been described in detail, it will be appreciated by those skilled in the art that various modifications and alterations would be developed in light of the overall teachings of the disclosure. Accordingly, the particular arrangements disclosed are meant to be illustrative only and not limiting as to the scope of the invention which is to be given the full breadth of the appended claims and in any and all equivalents thereof.

What is claimed is:

1. A fastener for securing two members and operable at cryogenic temperatures, said two members having a predetermined combined thickness with axially aligned holes therethrough for receiving said fastener which comprises:

a generally cylindrical nut having a neck portion with an internally threaded bore therethrough, and a first substantially flat head portion axially adjacent one end of the neck portion;

a generally cylindrical bolt having an externally threaded body portion adapted to engage the internally threaded bore of the nut, and a second substantially flat head portion axially adjacent one end of the body portion, the nut and bolt cooperating in such a manner that said respective head portions are disposed at opposite ends of an assembled fastener; and wherein each of said head portions of said nut and bolt have outer circumferential surfaces which are inwardly tapered toward said neck and body portions, respectively, and said holes of said two members each have a corresponding and oppositely tapered portion adjacent one surface for respectively receiving said tapered head portions of said nut and bolt, the length of a fully assembled fastener being not greater than the combined thickness of said two members, and the fastener being made of a material having a predetermined coefficient of thermal expansion such that said assembled fastener maintains a predetermined contact pressure between said two members and said flat head portions of said nut and bolt remain flush with said respective surfaces of each of said two members as said two fastened members are cooled to cryogenic temperatures whereby frictional heating of said two members is prevented.

2. The fastener as recited in claim 1, wherein said outer circumferential surfaces are tapered at an angle of about thirty-one degrees.

3. The fastener as recited in claim 1, wherein the fastener is made of aluminum.

4. The fastener as recited in claim 1, wherein the fastener is made of stainless steel.

5. The fastener as recited in claim 1, wherein the first head portion of the nut has a plurality of slots therein on a surface opposite to that of the neck portion.

6. The fastener as recited in claim 5, wherein the second head portion of the bolt has a plurality of slots therein on a surface opposite to that of the body portion.

7. The fastener as recited in claim 6, wherein the fastener includes three slots in the first and second head portions thereof.

8. The fastener as recited in claim 1, wherein the length of the nut and that of the body of the bolt are substantially equal, said length being longer that the thickness of said members to be fastened together such that the nut extends through one end of said members and extends into at least a portion of the other, whereby the nut resists any shear loads between said two fastened members.

9. A fastener for securing two members having a predetermined combined thickness, the fastener being made of a material selected to have a predetermined coefficient of thermal expansion, and comprising:
- a generally cylindrical middle portion having a first diameter;
- a first substantially flat cap portion having a second diameter larger than the first diameter, the first cap portion being disposed at one end of the middle portion, and a first tapered transition zone connected therebetween;
- a second substantially flat cap portion having a diameter equal to the second diameter of the first cap portion, the second cap portion being disposed at an opposite end of the middle portion, and a second tapered transition zone connected therebetween; and
- wherein the fastener has a length which is not greater than the combined thickness of said two members such that the fastener provides a pre-determined contact pressure for securing said members.

10. The fastener as recited in claim 9, further comprising:
- a nut having a neck comprised of the middle portion and a first head comprised of the first cap portion with the first tapered transition zone therebetween, and having an internally threaded bore therethrough, the bore having a third diameter; and
- a bolt having a generally cylindrically body portion adapted to threadingly engage the threaded bore of the nut, and a second head comprised of the second cap portion having the second tapered transition zone and thereby defining a shoulder on the second head at the connection between the second head and the body portion, whereby the nut and the bolt cooperate to form the fastener.

11. The fastener as recited in claim 10, wherein the nut and the bolt each have a plurality of slots in their respective heads, said slots adapted to receive a corresponding plurality of fingers, said fingers being part of a torquing means for rotating the nut relative to the bolt for threadingly securing the nut and bolt together to form the fastener.

12. The fastener as recited in claim 9, wherein said first and second tapered transitions zones are oriented at an angle of about thirty-one degrees.

13. The fastener as recited in claim 9, wherein the fastener is made of aluminum.

14. The fastener as recited in claim 9, wherein the fastener is made of stainless steel.

15. The fastener as recited in claim 11, wherein the nut and the bolt each include three slots in the respective head portions thereof.

16. The fastener as recited in claim 10, wherein the length of the nut and that of the body of the bolt are substantially equal, said length being longer than the thickness of said members to be fastened together such that the nut extends through one end of said members and extends into at least a portion of the other, whereby the nut resists any shear loads between said two fastened members.

* * * * *